United States Patent
Kim et al.

(10) Patent No.: US 12,435,164 B2
(45) Date of Patent: Oct. 7, 2025

(54) PHOTOCURABLE COMPOSITION, COATING LAYER COMPRISING CURED PRODUCT THEREOF, AND SUBSTRATE FOR SEMICONDUCTOR PROCESS

(71) Applicant: LG CHEM, LTD., Seoul (KR)

(72) Inventors: Sang Hwan Kim, Daejeon (KR); Jung Woo Choi, Daejeon (KR); Ki Seung Seo, Daejeon (KR); Kwang Su Seo, Daejeon (KR); Jun Beom Park, Daejeon (KR); Won Seup Cho, Daejeon (KR)

(73) Assignee: LG CHEM, LTD., Seoul (KR)

(*) Notice: Subject to any disclaimer, the term of this patent is extended or adjusted under 35 U.S.C. 154(b) by 450 days.

(21) Appl. No.: 17/917,101

(22) PCT Filed: Jul. 22, 2021

(86) PCT No.: PCT/KR2021/009486
§ 371 (c)(1),
(2) Date: Oct. 5, 2022

(87) PCT Pub. No.: WO2022/019677
PCT Pub. Date: Jan. 27, 2022

(65) Prior Publication Data
US 2023/0151123 A1    May 18, 2023

(30) Foreign Application Priority Data
Jul. 22, 2020 (KR) .................. 10-2020-0091287

(51) Int. Cl.
*C08F 2/46* (2006.01)
*C08F 2/50* (2006.01)
*C08F 220/18* (2006.01)
*C08F 220/20* (2006.01)
*C08F 220/30* (2006.01)
*C08F 222/10* (2006.01)
*C08G 18/10* (2006.01)
*C08G 18/24* (2006.01)
*C08G 18/44* (2006.01)
*C08G 18/62* (2006.01)
*C08G 61/04* (2006.01)
*C08J 7/04* (2020.01)
*C08J 7/046* (2020.01)
*H01L 21/683* (2006.01)

(52) U.S. Cl.
CPC .......... *C08F 2/50* (2013.01); *C08F 220/1808* (2020.02); *C08F 220/1811* (2020.02); *C08F 220/20* (2013.01); *C08F 220/301* (2020.02); *C08F 222/1065* (2020.02); *C08G 18/10* (2013.01); *C08G 18/246* (2013.01); *C08G 18/44* (2013.01); *C08G 18/6229* (2013.01); *C08J 7/042* (2013.01); *C08J 7/046* (2020.01); *H01L 21/6836* (2013.01); *C08G 2150/00* (2013.01); *C08J 2375/14* (2013.01)

(58) Field of Classification Search
CPC .. C08F 2/50; C08F 220/301; C08F 220/1808; C08F 220/20; C08F 220/1811; C08F 290/067; C08F 222/4065; C08F 222/103; C08F 222/102; C09D 175/16; H01L 21/6836; C08G 18/10; C08G 18/44; C08G 18/6229; C08G 18/246; C08G 18/672; C08G 18/755; C08G 18/722; C08G 18/73; C08G 2150/00; C08J 7/0427; C08J 7/042; C08J 7/046; C08J 7/044; C08J 2375/14; C08J 2433/14; C08J 2367/02
USPC .............. 522/97, 90, 1, 71, 189, 184; 520/1
See application file for complete search history.

(56) References Cited

U.S. PATENT DOCUMENTS

| | | | |
|---|---|---|---|
| 10,717,907 | B2 | 7/2020 | Wang et al. |
| 11,339,288 | B2 | 5/2022 | Kim et al. |
| 2008/0226916 | A1 | 9/2008 | Steeman et al. |
| 2013/0265522 | A1 | 10/2013 | Jung et al. |
| 2020/0157258 | A1 | 5/2020 | Saitoh et al. |
| 2020/0339809 | A1 | 10/2020 | Kim et al. |

FOREIGN PATENT DOCUMENTS

| | | | |
|---|---|---|---|
| JP | 2002501556 | A | 1/2002 |
| JP | 2006152289 | A | 6/2006 |
| JP | 2008-192217 | A | 8/2008 |
| JP | 4380396 | B2 | 12/2009 |
| JP | 2010-043194 | A | 2/2010 |
| JP | 2010287718 | A | 12/2010 |
| JP | 2011-231142 | A | 11/2011 |
| JP | 2014-132075 | A | 7/2014 |
| JP | 2015147700 | A | 8/2015 |
| JP | 2016107409 | A | 6/2016 |
| JP | 2017128634 | A * | 7/2017 |

(Continued)

OTHER PUBLICATIONS

Matsushiro et al, JP 2017128634 Machine Translation, Jul. 27, 2017 (Year: 2017).*
Saito et al, JP 2020083949 Machine Translation, Jun. 4, 2020 (Year: 2020).*
Extended European Search Report from EPO in Application No. 21845223.3 dated Oct. 25, 2023, 6 pages.
International Search Report issued for International Application No. PCT/KR2021/009486, Nov. 10, 2021, 4 pages.

*Primary Examiner* — Jessica Whiteley
(74) *Attorney, Agent, or Firm* — ROTHWELL, FIGG, ERNST & MANBECK, P.C.

(57) ABSTRACT

The present disclosure provides a photocurable composition, which has excellent coatability and is capable of providing a coating layer having excellent surface quality and thickness uniformity, a coating layer including a cured product of the photocurable composition, and a substrate for a semiconductor process including the coating layer.

16 Claims, 1 Drawing Sheet

(56) References Cited

FOREIGN PATENT DOCUMENTS

| | | | |
|---|---|---|---|
| JP | 6568383 B2 | 8/2019 | |
| JP | 6647107 B2 | 2/2020 | |
| JP | 2020083949 A * | 6/2020 | ............. B33Y 10/00 |
| KR | 10-2008-0008062 A | 1/2008 | |
| KR | 10-2013-0073353 A | 7/2013 | |
| KR | 10-1546937 B1 | 8/2015 | |
| KR | 10-2016-0057617 A | 5/2016 | |
| KR | 10-2036100 B1 | 10/2019 | |
| KR | 10-2049589 B1 | 11/2019 | |
| TW | 201627456 A | 8/2016 | |
| TW | 201922830 A | 6/2019 | |
| WO | 2013-012031 A1 | 1/2013 | |
| WO | 2019093731 A1 | 5/2019 | |

\* cited by examiner

[Fig. 1a]
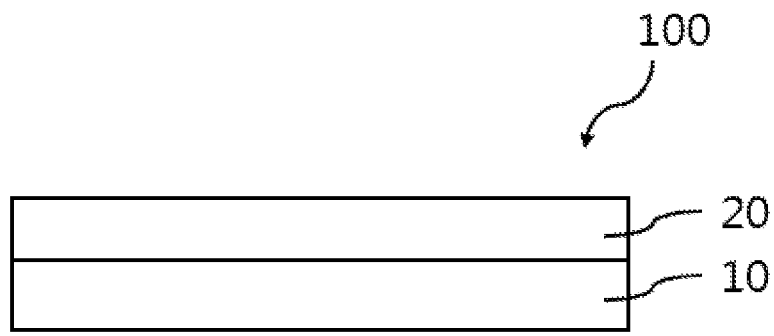
[Fig. 1b]
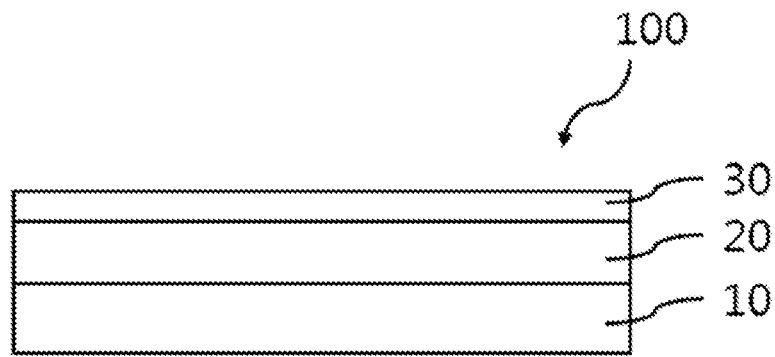

PHOTOCURABLE COMPOSITION, COATING LAYER COMPRISING CURED PRODUCT THEREOF, AND SUBSTRATE FOR SEMICONDUCTOR PROCESS

TECHNICAL FIELD

This application is a 35 U.S.C. 371 National Phase Entry Application from PCT/KR2021/009486 filed on Jul. 22, 2021, which claims the benefit of the filing date of Korean Patent Application No. 10-2020-0091287 filed with the Korean Intellectual Property Office on Jul. 22, 2020, the entire contents of which are incorporated herein by reference.

The present disclosure relates to a photocurable composition, a coating layer including a cured product thereof, and a substrate for a semiconductor process including the coating layer.

BACKGROUND OF THE INVENTION

A protective film in a semiconductor wafer processing process such as a dicing process or a back grinding process is a multilayer laminate product including a substrate for semiconductor process and an adhesive layer, and is used to temporarily protect a wafer during the semiconductor process.

The substrate for a semiconductor process includes a substrate film. As the substrate film, a plastic film such as polyethylene terephthalate, polyolefin, ethylene-vinyl acetate, polybutylene terephthalate, polypropylene or polyethylene is mainly used. Such plastic films may be produced by melting various thermoplastic resins and applying the molten resins to a T-die, blow-extrusion or calendering process. Such films produced by the extrusion or calendering process have advantages of high productivity and low prices.

In recent years, in order to prevent warpage of a wafer after backside grinding, studies have been conducted to provide a substrate for a semiconductor process, which is capable of relaxing stress, by forming a polyurethane coating layer on a substrate film. However, there is a problem in that, since the urethane group has high hydrophilicity, the polyurethane coating layer has poor wettability to the substrate film, and thus has poor coatability and surface quality. This causes problems in that the efficiency with which the substrate for a semiconductor process is produced is lowered and the production cost of the substrate increases.

Accordingly, there is a need for a technology capable of producing a substrate for a semiconductor process having an excellent coatability and excellent surface quality while having excellent stress relaxation performance.

BRIEF DESCRIPTION OF THE INVENTION

Technical Problem

The present disclosure is intended to provide a photocurable composition which has excellent coatability and is capable of providing a coating layer having excellent surface quality and thickness uniformity, a coating layer including a cured product of the photocurable composition, and a substrate for a semiconductor process including the coating layer.

However, the technical problem to be achieved by the present disclosure is not limited to the above-mentioned problem, and other problems not mentioned herein will be clearly understood by those skilled in the art from the following description.

Technical Solution

One embodiment of the present disclosure provides a photocurable composition containing: a urethane (meth)acrylate-based resin syrup including a urethane (meth)acrylate-based resin, which is a reaction product of a polyalkylene carbonate-based urethane prepolymer having an isocyanate end group and a reactive group-containing (meth)acrylate-based compound, and a (meth)acrylate-based monomer mixture; a polyfunctional urethane (meth)acrylate-based compound; and a polyfunctional (meth)acrylate-based compound, wherein the urethane (meth)acrylate-based resin includes a carbonate repeating unit containing a $C_{1-10}$ alkylene having at least one $C_{1-3}$ side chain attached thereto.

Another embodiment of the present disclosure provides a coating layer including a cured product of the photocurable composition.

Still another embodiment of the present disclosure provides a substrate for a semiconductor process including: a substrate film; and the coating layer.

Advantageous Effects

The photocurable composition according to one embodiment of the present disclosure may have excellent coatability and provide a coating layer having excellent surface quality and thickness uniformity.

In addition, the photocurable composition according to one embodiment of the present disclosure is possible to produce a coating layer having excellent stress relaxation performance and mechanical properties by using the photocurable composition.

In addition, the coating layer according to one embodiment of the present disclosure is possible to more effectively reduce the below-described total thickness variation (TTV) of the coating layer.

In addition, the coating layer according to one embodiment of the present disclosure is possible to produce a coating layer having excellent stress relaxation performance and mechanical properties.

In addition, the substrate for a semiconductor process according to one embodiment of the present disclosure has excellent stress relaxation performance, and thus may minimize wafer shrinkage during wafer processing.

The effects of the present invention are not limited to the above-described effect, and effects which are not mentioned will be clearly understood by those skilled in the art from the present specification and the accompanying drawings.

BRIEF DESCRIPTION OF DRAWINGS

FIGS. 1a and 1b each illustrate a substrate for a semiconductor process according to one embodiment of the present disclosure.

DETAILED DESCRIPTION OF THE INVENTION

Throughout the present specification, it is to be understood that when any part is referred to as "including" any component, it does not exclude other components, but may further include other components, unless otherwise specified.

Throughout the present specification, when any member is referred to as being "on" another member, it not only refers to a case where any member is in contact with another member, but also a case where a third member exists between the two members.

Throughout the present specification, the unit "parts by weight" may refer to the ratio of weight between components.

Throughout the present specification, the term "(meth) acrylate" is meant to include acrylate and methacrylate.

Throughout the present specification, terms including ordinal numbers such as "first" and "second" are used for the purpose of distinguishing one component from other components, and the components are not limited by the ordinal numbers. For example, a first component may be termed a second component without departing the scope of the present disclosure, and similarly, a second component may also be termed a first component.

Throughout the present specification, the term "prepolymer" may refer to a polymer obtained by polymerizing compounds to a certain degree, and may refer to a polymer which has not reached a completely polymerized state and may further be polymerized.

Throughout the present specification, the "weight-average molecular weight" and "number-average molecular weight" of any compound may be calculated using the molecular weight and molecular weight distribution of the compound. Specifically, the molecular weight and molecular weight distribution of the compound may be obtained by: placing tetrahydrofuran (THF) and the compound in a 50-ml glass vial to prepare a test sample in which the concentration of the compound is 1 wt %; filtering a standard sample (polystyrene) and the test sample through a filter (pore size: 0.45 μm); injecting each of the sample filtrates into a GPC injector; and comparing the elution time of the test sample with a calibration curve of the standard sample. At this time, Infinity II 1260 (Agilent Technologies, Inc.) may be used as a measurement instrument, and the flow rate and the column temperature may be set at 1.00 mL/min and 35.0° C., respectively.

Throughout the present specification, the viscosity of any compound (or composition) may be a value measured with a Brookfield viscometer at a certain temperature. Specifically, the compound (or composition) is debubbled to a bubble-free state, and then 0.5 mL is sampled therefrom by means of a 5-mL syringe. The viscosity of the sample is measured using a Brookfield viscometer (Brookfield HB) on spindle No. 40 at a constant temperature (20° C. or 25° C.) for 10 minutes, and the cP value at the time point when the viscosity does not change is determined.

Throughout the present specification, the term "alkyl group" may be meant to include a hydrocarbon chain structure in which an unsaturated bond does not exist in a functional group. In addition, the term "alicyclic alkyl group" may include a carbon ring structure in which an unsaturated bond does not exist in a functional group, and may be meant to include a monocyclic ring or polycyclic ring.

Hereinafter, the present disclosure will be described in further detail.

One embodiment of the present disclosure provides a photocurable composition containing: a urethane (meth) acrylate-based resin syrup including a urethane (meth)acrylate-based resin, which is a reaction product of a polyalkylene carbonate-based urethane prepolymer having an isocyanate end group and a reactive group-containing (meth) acrylate-based compound, and a (meth)acrylate-based monomer mixture; a polyfunctional urethane (meth)acrylate-based compound; and a polyfunctional (meth)acrylate-based compound, wherein the urethane (meth)acrylate-based resin includes a carbonate repeating unit containing a $C_{1-10}$ alkylene having at least one $C_{1-3}$ side chain attached thereto.

The photocurable composition according to one embodiment of the present disclosure may have excellent coatability and provide a coating layer having excellent surface quality and thickness uniformity. In addition, it is possible to produce a coating layer having excellent stress relaxation performance and mechanical properties by using the photocurable composition.

According to one embodiment of the present disclosure, the urethane (meth)acrylate-based resin syrup may include the urethane (meth)acrylate-based resin and the (meth)acrylate-based monomer mixture. Specifically, the urethane (meth)acrylate-based resin includes a carbonate repeating unit containing a $C_{1-10}$ alkylene having at least one $C_{1-3}$ side chain attached thereto, and thus the urethane (meth)acrylate-based resin may have a high weight-average molecular weight, and the urethane (meth)acrylate-based resin syrup may have a relatively low viscosity. Accordingly, the photocurable composition containing the urethane (meth)acrylate-based resin syrup may have excellent coatability due to its improved wettability, and enhance the surface quality and thickness uniformity of a coating layer produced therefrom. In addition, the photocurable composition may easily provide a coating layer having excellent stress relaxation performance.

According to one embodiment of the present disclosure, the weight-average molecular weight of the urethane (meth) acrylate-based resin may be 20,000 g/mol to 50,000 g/mol. Specifically, the weight-average molecular weight of the urethane (meth)acrylate-based resin may be 20,000 g/mol to 47,000 g/mol, 20,000 g/mol to 45,000 g/mol, 20,000 g/mol to 42,000 g/mol, 20,000 g/mol to 40,000 g/mol, 20,000 g/mol to 38,000 g/mol, 20,000 g/mol to 35,000 g/mol, 20,000 g/mol to 33,000 g/mol, 20,000 g/mol to 31,000 g/mol, 25,000 g/mol to 50,000 g/mol, 26,000 g/mol to 48,000 g/mol, 27,000 g/mol to 45,000 g/mol, 28,000 g/mol to 40,000 g/mol, 29,000 g/mol to 38,000 g/mol, or 30,000 g/mol to 35,000 g/mol.

Where the weight-average molecular weight of the urethane (meth)acrylate-based resin is within the above-described range, the photocurable composition may provide a coating layer having improved stress relaxation performance and mechanical properties. In addition, when the weight-average molecular weight of the urethane (meth)acrylate-based resin is controlled within the above-described range, it is possible to suppress deterioration in the coatability of the photocurable composition.

According to one embodiment of the present disclosure, the urethane (meth)acrylate-based resin syrup may have a viscosity of 400 cP to 3,300 cP. Specifically, the urethane (meth)acrylate-based resin syrup may have a viscosity of 500 cP to 3,300 cP at 20° C. In addition, the urethane (meth)acrylate-based resin syrup may have a viscosity of 400 cP to 3,000 cP at 25° C. The viscosities of the urethane (meth)acrylate-based resin syrup at 20° C. and 25° C. may be values measured with a Brookfield HB on spindle No. 40 as described above.

According to one exemplary embodiment of the present disclosure, the viscosity of the urethane (meth)acrylate-based resin syrup at 20° C. may be 550 cP to 3,250 cP, 600 cP to 3,200 cP, 700 cP to 3,150 cP, 750 cP to 3,100 cP, 500 cP to 2,500 cP, 550 cP to 2,300 cP, 600 cP to 2,100 cP, 650 cP to 2,000 cP, 700 cP to 1,900 cP, 750 cP to 1,850 cP, 1,000 cP to 3,300 cP, 1,200 cP to 3,250 cP, 1,500 cP to 3,200 cP, 1,700 cP to 3,150 cP, or 1,800 cP to 3,100 cP.

In addition, the viscosity of the urethane (meth)acrylate-based resin syrup at 25° C. may be 415 cP to 3,200 cP, 430 cP to 3,100 cP, 450 cP to 3,000 cP, 480 cP to 2,800 cP, 400 cP to 1,500 cP, 420 cP to 1,450 cP, 440 cP to 1,400 cP, 450 cP to 1,350 cP, 475 cP to 1,300 cP, 490 cP to 1,260 cP, 750 cP to 3,300 cP, 850 cP to 3,200 cP, 950 cP to 3,000 cP, 1,000 cP to 2,800 cP, or 1,200 cP to 2,700 cP.

Where the viscosity of the urethane (meth)acrylate-based resin syrup at 20° C. and/or 25° C. is within the above-described range, it is possible to effectively improve the coatability of the photocurable composition. When the viscosity of the urethane (meth)acrylate-based resin syrup is controlled within the above-described range, it is possible to enhance the surface quality and thickness uniformity of a coating layer produced from the photocurable composition. Specifically, it is possible to more effectively reduce the below-described total thickness variation (TTV) of the coating layer.

According to one embodiment of the present disclosure, the polyalkylene carbonate-based urethane prepolymer may be a reaction product of a first mixture containing a polyalkylene carbonate-based polyol and a diisocyanate-based compound. Specifically, the polyalkylene carbonate-based urethane prepolymer may be formed by a polymerization reaction between the polyalkylene carbonate-based polyol and the diisocyanate-based compound. That is, as the reaction proceeds between the isocyanate group of the diisocyanate-based compound and the hydroxyl group of the polyalkylene carbonate-based polyol, a urethane bond is formed, and a polyalkylene carbonate-based urethane prepolymer having an isocyanate group at the end thereof may be formed.

According to one embodiment of the present disclosure, the polyalkylene carbonate-based polyol may include a carbonate repeating unit containing a $C_{1-10}$ alkylene having at least one $C_{1-3}$ side chain attached thereto. That is, the carbonate repeating unit containing a $C_{1-10}$ alkylene having at least one $C_{1-3}$ side chain attached thereto, which is included in the urethane (meth)acrylate-based resin, may be derived from the polyalkylene carbonate-based polyol.

According to one embodiment of the present disclosure, the polyalkylene carbonate-based polyol may include one or more carbonate repeating units. Specifically, at least one of the carbonate repeating units included in the polyalkylene carbonate-based polyol may be a carbonate repeating unit containing a $C_{1-10}$ alkylene having at least one $C_{1-3}$ side chain attached thereto. Where the polyalkylene carbonate-based polyol including the above-described carbonate repeating unit is used, it is possible to produce the urethane (meth)acrylate-based resin syrup having a low viscosity while having a high weight-average molecular weight.

For example, the carbonate repeating unit containing a $C_{1-10}$ alkylene having at least one $C_{1-3}$ side chain attached thereto may be represented by the following Formula 2:

[Formula 2]

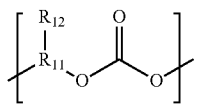

wherein $R_{11}$ is a $C_{1-10}$ alkylene, and $R_{12}$ is a $C_{1-3}$ alkyl group.

The $C_{1-10}$ alkylene contained in the carbonate repeating unit may be linear. In addition, the number of carbon atoms in the alkylene contained in the carbonate repeating unit may be 3 to 8, 5 to 6, or 4 to 5. In addition, at least one $C_{1-3}$ alkyl group may be attached to the main chain of the alkylene. Specifically, a methyl group, an ethyl group, or a propyl group may be attached to the alkylene. More specifically, the carbonate repeating unit may contain a $C_{4-6}$ alkylene having a methyl group attached thereto. Where the number of carbon atoms in the alkylene contained in the carbonate repeating unit and the number of carbon atoms in the side chain are within the above-described ranges, the urethane (meth)acrylate-based resin syrup may have a low viscosity while having a high weight-average molecular weight.

In addition, the polyalkylene carbonate-based polyol may contain two or more hydroxyl groups. Specifically, the polyalkylene carbonate-based polyol may be a polyalkylene carbonate-based diol including the above-described carbonate repeating unit.

According to one embodiment of the present disclosure, the diisocyanate-based compound may include at least one of bis(isocyanatomethyl)cyclohexane, methylene diphenyl diisocyanate, toluene diisocyanate, hexamethylene diisocyanate, isophorone diisocyanate, m-xylene diisocyanate, dicyclohexylmethane diisocyanate, and tetramethylxylene diisocyanate. However, the type of diisocyanate-based compound is not limited to those described above.

According to one embodiment of the present disclosure, the content of the diisocyanate-based compound contained in the first mixture may be 10 parts by weight to 20 parts by weight based on 100 parts by weight of the polyalkylene carbonate-based polyol.

Specifically, the content of the diisocyanate-based compound contained in the first mixture may be 11.5 parts by weight to 18 parts by weight, 12.5 parts by weight to 16 parts by weight, 10 parts by weight to 15 parts by weight, or 14 parts by weight to 18 parts by weight, based on 100 parts by weight of the polyalkylene carbonate-based polyol. Where the content of the diisocyanate-based compound is within the above-described range, the polyalkylene carbonate-based urethane prepolymer may be stably formed. In addition, where the content of the diisocyanate-based compound is controlled within the above-described range, the urethane (meth)acrylate-based resin syrup having a low viscosity while having a large weight-average molecular weight may be effectively formed.

According to one embodiment of the present disclosure, the first mixture may contain a monomer for viscosity adjustment. Where the monomer for viscosity adjustment is added to the first mixture, the polyalkylene carbonate-based urethane prepolymer may have an appropriate viscosity. Where the viscosity of the polyalkylene carbonate-based urethane prepolymer is adjusted using the monomer for viscosity adjustment, the polyalkylene carbonate-based urethane prepolymer may be easily polymerized with the reactive group-containing (meth)acrylate-based compound.

The monomer for viscosity adjustment may include at least one of isobornyl (meth)acrylate, cyclohexyl (meth)acrylate, t-butylcyclohexyl (meth)acrylate, and trimethylcyclohexyl (meth)acrylate. Meanwhile, the monomer for viscosity adjustment contained in the first mixture may remain in the urethane (meth)acrylate-based resin syrup and be incorporated into the (meth)acrylate-based monomer mixture to be described later. That is, where the monomer for viscosity adjustment contained in the first mixture remains in the urethane (meth)acrylate-based resin syrup, the viscosity of the urethane (meth)acrylate-based resin syrup may be easily adjusted within the above-described range.

According to one embodiment of the present disclosure, the urethane (meth)acrylate-based resin may be a reaction product of a second mixture containing a polyalkylene carbonate-based urethane prepolymer having an isocyanate end group and a reactive group-containing (meth)acrylate-based compound. That is, the urethane (meth)acrylate-based resin may be formed by a polymerization reaction between the polyalkylene carbonate-based urethane prepolymer and the reactive group-containing (meth)acrylate-based compound. Specifically, as the reaction proceeds between the isocyanate group located at the end of the polyalkylene carbonate-based urethane prepolymer and the reactive group of the reactive group-containing (meth)acrylate-based compound, the urethane (meth)acrylate-based resin may be formed. Thereby, the end of the urethane (meth)acrylate-based resin may be capped by acrylation with the reactive group-containing (meth)acrylate-based compound. In addition, the second mixture may contain a monomer for viscosity adjustment, and the monomer for viscosity adjustment contained in the second mixture may be the monomer for viscosity adjustment remaining after contained in the first mixture.

According to one embodiment of the present disclosure, the reactive group of the reactive group-containing (meth)acrylate-based compound may include a hydroxyl group (—OH). In terms of polymerization reactivity with an isocyanate group located at the end of the polyalkylene carbonate-based urethane prepolymer, a (meth)acrylate-based compound containing a hydroxyl group as a reactive group may be used. The (meth)acrylate-based compound containing a hydroxyl group as a reactive group may react with an isocyanate group located at the end of the polyalkylene carbonate-based urethane prepolymer to form a urethane bond. The urethane (meth)acrylate-based resin may be rapidly cured by UV light, and a cured product of the photocurable composition containing the urethane (meth)acrylate-based resin syrup may have excellent stress relaxation performance.

According to one embodiment of the present disclosure, the reactive group-containing (meth)acrylate-based compound may not contain a carboxyl group. That is, the reactive group-containing (meth)acrylate-based compound may not contain a carboxyl group as a reactive group. If the reactive group-containing (meth)acrylate-based compound contains a carboxyl group as a reactive group, the reactivity thereof with the isocyanate group located at the terminal of the polyalkylene carbonate-based urethane prepolymer can be poor, and thus it may not be easy to form the urethane (meth)acrylate-based resin. In addition, if the reactive group-containing (meth)acrylate-based compound contains a carboxyl group as a reactive group, a problem may arise in that the stress relaxation performance of a cured product of the photocurable composition deteriorates.

Therefore, according to one embodiment of the present disclosure, the urethane (meth)acrylate-based resin may be easily formed using a (meth)acrylate-based compound that does not contain a carboxyl group as a reactive group. In addition, it is possible to provide a photocurable composition capable of forming a coating layer having excellent stress relaxation performance.

According to one embodiment of the present disclosure, the reactive group-containing (meth)acrylate-based compound may contain an alkylene having 4 or less carbon atoms. Specifically, the reactive group-containing (meth)acrylate-based compound may include at least one of hydroxymethyl (meth)acrylate, hydroxyethyl (meth)acrylate, hydroxypropyl (meth)acrylate, and hydroxybutyl (meth)acrylate. The photocurable composition containing a reactive group-containing (meth)acrylate-based compound, which has an alkylene having 4 or less carbon atoms, and the urethane (meth)acrylate-based resin derived from the polyalkylene carbonate-based urethane prepolymer may have excellent coatability and provide a coating layer having excellent surface quality, thickness uniformity and stress relaxation performance.

According to an exemplary embodiment of the present disclosure, the content of the reactive group-containing (meth)acrylate-based compound contained in the second mixture may be 1 part by weight to 10 parts by weight based on 100 parts by weight of the polyalkylene carbonate-based urethane prepolymer. Specifically, the content of the reactive group-containing (meth)acrylate-based compound may be 1.5 parts by weight to 8.5 parts by weight, 2 parts by weight to 7 parts by weight, 3.5 parts by weight to 6.5 parts by weight, 1 part by weight to 6 parts by weight, 1.5 parts by weight to 5.5 parts by weight, 2 parts by weight to 5 parts by weight, 2 parts by weight to 4.5 parts by weight, 3 parts by weight to 10 parts by weight, 3.2 parts by weight to 8.5 parts by weight, 3.5 parts by weight to 7.5 parts by weight, 3.7 parts by weight to 7 parts by weight, or 4 parts by weight to 6.5 parts by weight, based on 100 parts by weight of the polyalkylene carbonate-based urethane prepolymer.

Where the content of the reactive group-containing (meth)acrylate-based compound is controlled within the above-described range, it is possible to further improve the stress relaxation performance and mechanical properties of a coating layer including a cured product of the photocurable composition. In addition, where the content of the reactive group-containing (meth)acrylate-based compound is within the above-described range, it is possible to suppress deterioration in the coatability of the photocurable composition.

According to one embodiment of the present disclosure, the content of the urethane (meth)acrylate-based resin may be 15 parts by weight to 35 parts by weight based on 100 parts by weight of the urethane (meth)acrylate-based resin syrup. Specifically, the content of the urethane (meth)acrylate-based resin may be 17.5 parts by weight to 32.5 parts by weight, 20 parts by weight to 30 parts by weight, 23 parts by weight to 28 parts by weight, 15 parts by weight to 30 parts by weight, 18 parts by weight to 28.5 parts by weight, 20 parts by weight to 25 parts by weight, 20 parts by weight to 35 parts by weight, 21.5 parts by weight to 33 parts by weight, 22.5 parts by weight to 30 parts by weight, or 25 parts by weight to 27.5 parts by weight, based on 100 parts by weight of the urethane (meth)acrylate-based resin syrup.

When the content of the urethane (meth)acrylate-based resin is within the above-described range, the photocurable composition may provide a coating layer having excellent surface quality and thickness uniformity. In addition, where the content of the urethane (meth)acrylate-based resin is controlled within to the above-described range, it is possible to further improve the stress relaxation performance and mechanical properties of the coating layer.

According to one embodiment of the present disclosure, the urethane (meth)acrylate-based resin syrup may include a (meth)acrylate-based monomer mixture. The (meth)acrylate-based monomer mixture may adjust the viscosity of the urethane (meth)acrylate-based resin syrup and participate in the below-described photocuring reaction of the photocurable composition.

According to one embodiment of the present disclosure, the content of the (meth)acrylate-based monomer mixture may be 65 parts by weight to 85 parts by weight based on 100 parts by weight of the urethane (meth)acrylate-based resin syrup. Specifically, the content of the (meth)acrylate-based monomer mixture may be 67.5 parts by weight to 82.5 parts by weight, 70 parts by weight to 80 parts by weight, 72.5 parts by weight to 77.5 parts by weight, 65 parts by weight to 80 parts by weight, 68 parts by weight to 77 parts by weight, or 70 parts by weight to 75 parts by weight, based on 100 parts by weight of the urethane (meth)acrylate-based resin syrup.

Where the content of the (meth)acrylate-based monomer mixture is controlled within the above-described range, it is possible to easily adjust the viscosity of the urethane (meth) acrylate-based resin syrup within the above-described range. In addition, where the content of the (meth)acrylate-based monomer mixture satisfies the above-mentioned range, it is possible to enhance the coatability of the photocurable composition, and it is possible to effectively enhance the surface quality and thickness uniformity of a coating layer which is produced using the photocurable composition.

According to one embodiment of the present disclosure, the (meth)acrylate-based monomer mixture may contain at least one type of monomer selected from an alkyl group-containing (meth)acrylate-based monomer, an alicyclic alkyl group-containing (meth)acrylate-based monomer, an aromatic group-containing (meth)acrylate-based monomer, and a polar functional group-containing (meth)acrylate-based monomer.

According to one embodiment of the present disclosure, the alkyl group-containing (meth)acrylate-based monomer contained in the (meth)acrylate-based monomer mixture may include at least one of methyl (meth)acrylate, ethyl (meth)acrylate, n-propyl (meth)acrylate, isopropyl (meth) acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl-5-(meth)acrylate, and isooctyl (meth)acrylate According to one embodiment of the present disclosure, the content of the alkyl group-containing (meth)acrylate-based monomer contained in the (meth)acrylate-based monomer mixture may be 1 part by weight to 10 parts by weight, 2.5 parts by weight to 8.5 parts by weight, 4.5 parts by weight to 7 parts by weight, 1 part by weight to 7.5 parts by weight, 3 parts by weight to 7 parts by weight, 5 parts by weight to 6.5 parts by weight, 5 parts by weight to 10 parts by weight, or 5 parts by weight to 8 parts by weight, based on 100 parts by weight of the urethane (meth)acrylate-based resin syrup. Where the content of the alkyl group-containing (meth)acrylate-based monomer is controlled within the above-described range, it is possible to enhance the wettability of the photocurale composition by appropriately adjusting the viscosity thereof, and to form a more uniform and flat coating surface. In addition, where the content of the alkyl group-containing (meth)acrylate-based monomer is within the above-described range, it is possible to improve the tensile strength and stress relaxation properties of a coating layer including a cured product of the photocurable composition.

According to one embodiment of the present disclosure, the alicyclic alkyl group-containing (meth)acrylate-based monomer contained in the (meth)acrylate-based monomer mixture may include at least one of isobornyl (meth)acrylate, cyclohexyl (meth)acrylate, t-butylcyclohexyl (meth) acrylate, and trimethylcyclohexyl (meth)acrylate.

According to one embodiment of the present disclosure, the content of the alicyclic alkyl group-containing (meth) acrylate-based monomer contained in the (meth)acrylate-based monomer mixture may be 15 parts by weight to 45 parts by weight, 17.5 parts by weight to 42.5 parts by weight, 20 parts by weight to 40 parts by weight, 25 parts by weight to 35 parts by weight, 15 parts by weight to 40 parts by weight, 18 parts by weight to 38 parts by weight, 23 parts by weight to 35 parts by weight, 28 parts by weight to 33 parts by weight, 25 parts by weight to 40 parts by weight, 27.5 parts by weight to 37.5 parts by weight, or 30 parts by weight to 35 parts by weight, based on 100 parts by weight of the urethane (meth)acrylate-based resin syrup.

Where the content of the alicyclic alkyl group-containing (meth)acrylate-based monomer is controlled within the above-described range, it is possible to effectively enhance the coatability of the photocurable composition by adjusting the viscosity thereof, and to improve the mechanical properties of the coating layer.

Meanwhile, the alicyclic alkyl group-containing (meth) acrylate-based monomer contained in the (meth)acrylate-based monomer mixture may be the monomer for viscosity adjustment contained in the first mixture as described above. That is, the alicyclic alkyl group-containing (meth)acrylate-based monomer contained in the (meth)acrylate-based monomer mixture may be the monomer for viscosity adjustment remaining in the photocurable composition after contained in the first mixture. Accordingly, where the content of the alicyclic alkyl group-containing (meth)acrylate-based monomer is within the above-described range, it is possible to easily produce the polyalkylene carbonate-based urethane prepolymer and easily perform the polymerization between the polyalkylene carbonate-based urethane prepolymer and the reactive group-containing (meth)acrylate-based compound.

According to one embodiment of the present disclosure, the aromatic group-containing (meth)acrylate-based monomer contained in the (meth)acrylate-based monomer mixture may include at least one of phenylbenzyl (meth)acrylate, phenylthioethyl (meth)acrylate, O-phenylphenoxyethyl (meth)acrylate, and naphthylthioethyl (meth)acrylate.

According to one embodiment of the present disclosure, the content of the aromatic group-containing (meth)acrylate-based monomer contained in the (meth)acrylate-based monomer mixture may be 20 parts by weight to 35 parts by weight, 22.5 parts by weight to 32.5 parts by weight, 25 parts by weight to 30 parts by weight, 20 parts by weight to 30 parts by weight, 23 parts by weight to 28 parts by weight, 25 parts by weight to 35 parts by weight, or 27 parts by weight to 33 parts by weight, based on 100 parts by weight of the urethane (meth)acrylate-based resin syrup. Where the content of the aromatic group-containing (meth)acrylate-based monomer is within the above-described range, it is possible to improve the wettability of the photocurable composition and enhance the stress relaxation performance and mechanical properties of a cured product of the photocurable composition.

According to one embodiment of the present disclosure, the polar functional group-containing (meth)acrylate-based monomer contained in the (meth)acrylate-based monomer mixture may contain a hydroxyl group as a polar functional group. Specifically, the polar functional group-containing (meth)acrylate-based monomer may include at least one of 2-hydroxyethyl (meth)acrylate, 2-hydroxypropyl (meth) acrylate, 4-hydroxybutyl (meth)acrylate, 6-hydroxyhexyl (meth)acrylate, 8-hydroxyoctyl (meth)acrylate, 2-hydroxyethylene glycol (meth)acrylate, and 2-hydroxypropylene glycol (meth)acrylate.

According to one embodiment of the present disclosure, the content of the polar functional group-containing (meth)acrylate-based monomer contained in the (meth)acrylate-based monomer mixture may be 5 parts by weight to 15 parts by weight, 7 parts by weight to 12 parts by weight, 5 parts by weight to 10 parts by weight, or 8 parts by weight to 15 parts by weight, based on 100 parts by weight of the urethane (meth)acrylate-based resin syrup. Where the content of the polar functional group-containing (meth)acrylate-based monomer is controlled within the above-described range, it is possible to enhance the wettability and coatability of the photocurable composition, and it is possible to enhance the stress relaxation performance of a cured product of the photocurable composition.

According to one embodiment of the present disclosure, the photocurable composition may contain a polyfunctional urethane (meth)acrylate-based compound. As the polyfunctional urethane (meth)acrylate-based compound is contained, it is possible to appropriately control the crosslinking reaction of the photocurable composition, and the photocurable composition may provide a coating layer having improved tensile strength and stress relaxation properties.

According to one embodiment of the present disclosure, the polyfunctional urethane (meth)acrylate-based compound may contain two or more (meth)acrylate groups as a functional group. Specifically, the polyfunctional urethane (meth)acrylate-based compound may contain 2 to 6, or 3 to 5 (meth)acrylate groups. Through the photocurable composition containing the polyfunctional urethane (meth)acrylate-based compound containing a number of functional groups within the above range, it is possible to provide a coating layer having further improved stress relaxation performance and mechanical properties. In addition, the above-described types of polyfunctional urethane (meth)acrylate-based compounds may be used alone or in combination.

According to one embodiment of the present disclosure, the polyfunctional urethane (meth)acrylate-based compound may include a polymerization unit derived from caprolactone acrylate and three or more (meth)acrylate groups. Specifically, the polyfunctional urethane (meth)acrylate-based compound may include a compound represented by the following Formula 1:

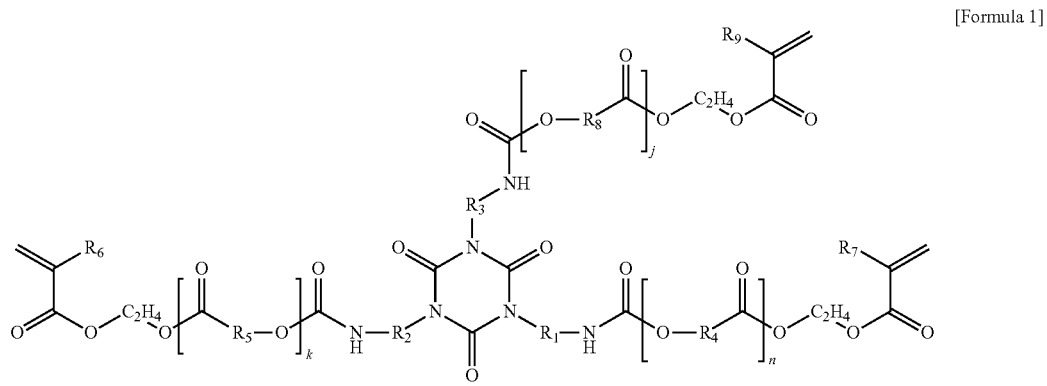

[Formula 1]

wherein $R_1$, $R_2$ and $R_3$ are each independently a $C_{2-10}$ alkylene, $R_4$, $R_5$ and $R_6$ are each independently a $C_{2-7}$ alkylene, $R_7$, $R_8$ and $R_9$ are each independently hydrogen or a methyl group, and n, j and k are each independently an integer ranging from 1 to 3. Specifically, in Formula 1 above, $R_1$, $R_2$ and $R_3$ may be each independently a $C_{3-8}$ alkylene, a $C_{4-7}$ alkylene, or a $C_{5-6}$ alkylene. In addition, $R_4$, $R_5$ and $R_6$ may be each independently a $C_{3-6}$ alkylene.

As the polyfunctional urethane (meth)acrylate-based compound including the compound represented by Formula 1 is included, it is possible to appropriately control the crosslinking reaction of the photocurable composition, and to provide a photocurable composition capable of forming a coating layer having improved tensile strength and stress relaxation properties.

According to one embodiment of the present disclosure, the polyfunctional urethane (meth)acrylate-based compound may include a compound represented by the following Formula 1-1:

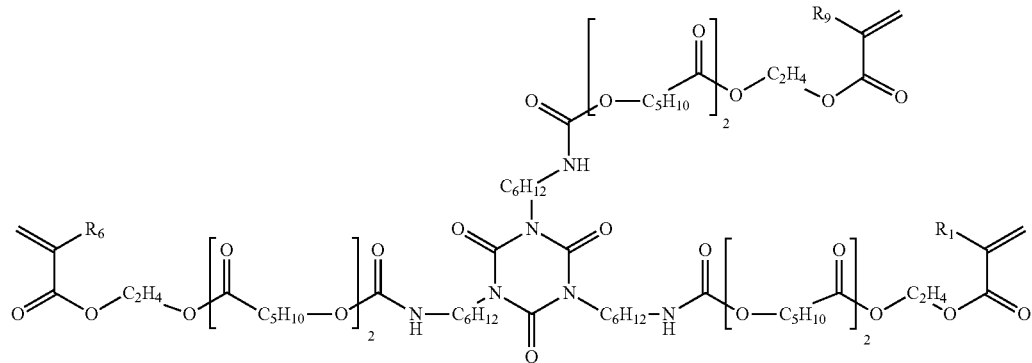

[Formula 1-1]

According to one embodiment of the present disclosure, the weight-average molecular weight of the polyfunctional urethane (meth)acrylate-based compound may be 2,000 g/mol to 5,000 g/mol. Specifically, the weight-average molecular weight of the polyfunctional urethane (meth) acrylate-based compound may be 2,500 g/mol to 4,500 g/mol, 3,000 g/mol to 4,000 g/mol, 3,500 g/mol to 3,800 g/mol, 2,000 g/mol to 4,000 g/mol, 2,300 g/mol to 3,800 g/mol, 2,700 g/mol to 3,600 g/mol, 3,100 g/mol to 3,500 g/mol, 3,000 g/mol to 5,000 g/mol, 3,200 g/mol to 4,800 g/mol, 3,300 g/mol to 4,500 g/mol, 3,500 g/mol to 4,200 g/mol, or 3,700 g/mol to 4,000 g/mol.

Where the weight-average molecular weight of the polyfunctional urethane (meth)acrylate-based compound is within the above-described range, it is possible to appropriately control the crosslinking reaction of the photocurable composition, and the photocurable composition is capable of easily providing a coating layer having excellent stress relaxation performance and tensile strength properties. Thereby, it is possible to prevent the coating layer from being deformed due to external impacts or conditions, and it is possible to suppress deterioration in the stress relaxation performance of the coating layer. In addition, where the weight-average molecular weight of the polyfunctional urethane (meth)acrylate-based compound is controlled within the above-described range, it is possible to suppress deterioration in the coatability of the photocurable composition.

According to one embodiment of the present disclosure, the content of the polyfunctional urethane (meth)acrylate-based compound may be 2.5 parts by weight to 7.5 parts by weight based on 100 parts by weight of the urethane (meth)acrylate-based resin. Specifically, the content of the polyfunctional urethane (meth)acrylate-based compound may be 3.5 parts by weight to 6 parts by weight, 4.5 parts by weight to 5.5 parts by weight, 2.5 parts by weight to 6 parts by weight, 3 parts by weight to 5.75 parts by weight, 3.25 parts by weight to 5.5 parts by weight, 3.5 parts by weight to 5.2 parts by weight, 3.75 parts by weight to 5 parts by weight, 4 parts by weight to 4.8 parts by weight, 4.5 parts by weight to 7.5 parts by weight, 4.5 parts by weight to 7 parts by weight, or 4.8 parts by weight to 6.5 parts by weight, based on 100 parts by weight of the urethane (meth)acrylate-based resin.

Where the content of the polyfunctional urethane (meth)acrylate-based compound is controlled within the above-described range, it is possible to improve the coatability of the photocurable composition, and to enhance the surface quality and thickness uniformity of the below-described coating layer. In addition, where the content of the polyfunctional urethane (meth)acrylate-based compound is within the above range, it is possible to effectively control the degree of crosslinking of a cured product of the photocurable composition, thereby effectively improving the stress relaxation performance and tensile strength of the coating layer.

According to one embodiment of the present disclosure, the photocurable composition may include a polyfunctional (meth)acrylate-based compound. The polyfunctional (meth)acrylate-based compound may contain two or more (meth)acrylate groups as a functional group. Specifically, the polyfunctional (meth)acrylate-based compound may contain 2 to 6, or 2 to 5 (meth)acrylate groups. Where the polyfunctional (meth)acrylate-based compound containing a number of functional groups within the above-described range is used, it is possible to control and enhance the curing density of the photocurable composition, and to provide a coating layer whose stress relaxation performance and tensile strength are easily controlled.

According to one embodiment of the present disclosure, the polyfunctional (meth)acrylate-based compound may include at least one of hexanediol di(meth)acrylate, tripropylene glycol di(meth)acrylate, ethylene glycol di(meth)acrylate, trimethylolpropane tri(meth)acrylate, trimethylolpropane ethoxy tri(meth)acrylate, glycerin propoxylated tri (meth)acrylate, pentaerythritol tetra(meth)acrylate, and dipentaerythritol hexa(meth)acrylate. In addition, the above-described types of polyfunctional (meth)acrylate-based compounds may be used alone or in combination.

According to one embodiment of the present disclosure, the content of the polyfunctional (meth)acrylate-based compound may be 1 part by weight to 5 parts by weight based on 100 parts by weight of the urethane (meth)acrylate-based resin. Specifically, the content of the polyfunctional (meth)acrylate-based compound may be 1.5 parts by weight to 4.5 parts by weight, 2 parts by weight to 4 parts by weight, 2.5 parts by weight to 3.5 parts by weight, 1 part by weight to 3.5 parts by weight, 1.75 parts by weight to 3.4 parts by weight, 2.25 parts by weight to 3.3 parts by weight, 2.75 parts by weight to 3.2 parts by weight, 2.5 parts by weight to 5 parts by weight, 2.7 parts by weight to 4.5 parts by weight, 3 parts by weight to 4 parts by weight, or 3.2 parts by weight to 3.5 parts by weight, based on 100 parts by weight of the urethane (meth)acrylate-based resin.

Where the content of the polyfunctional (meth)acrylate-based compound is controlled within the above-described range, it is possible to enhance the stress relaxation performance and mechanical properties of a cured product of the photocurable composition. In addition, where the content of the polyfunctional (meth)acrylate-based compound is within the above-described range, it is possible to suppress deterioration in the coatability of the photocurable composition and the surface quality of a coating layer formed from the photocurable composition.

According to one embodiment of the present disclosure, the photocurable composition may contain a photoinitiator. As the photoinitiator, any photoinitiator known in the art may be selected and used without limitation. For example, at least one of HP-8 (Miwon Specialty Co., Ltd.), Irgacure #651 (BASF), Irgacure #1173 (BASF), and CP-4 (Irgacure #184) may be used as the photoinitiator, but the type of photoinitiator is not limited thereto.

According to one embodiment of the present disclosure, the content of the photoinitiator may be 0.5 parts by weight to 3 parts by weight based on 100 parts by weight of the urethane (meth)acrylate-based resin. Specifically, the content of the photoinitiator may be 0.7 parts by weight to 2.75 parts by weight, 1 part by weight to 2.5 parts by weight, 1.5 parts by weight to 2.2 parts by weight, or 1.7 parts by weight to 2 parts by weight, based on 100 parts by weight of the urethane (meth)acrylate-based resin. Where the content of the photoinitiator is controlled within the above-mentioned range, it is possible to effectively perform the photocuring reaction of the photocurable composition.

According to one embodiment of the present disclosure, the viscosity of the photocurable composition may be 3,000 cP or less. Specifically, the viscosity of the photocurable composition at 25° C. may be 400 cP to 3,000 cP. More specifically, the viscosity of the photocurable composition at 25° C. may be 450 cP to 2,900 cP, 500 cP to 2,800 cP, 400 cP to 2,000 cP, 425 cP to 1,800 cP, 450 cP to 1,650 cP, 475 cP to 1,550 cP, 500 cP to 1,450 cP, 525 cP to 1,400 cP, 550 cP to 1,350 cP, 1,000 cP to 3,000 cP, 1,100 cP to 2,950 cP, 1,200 cP to 2,900 cP, 1,250 cP to 2,850 cP, or 1,300 cP to 2,800 cP.

The photocurable composition having a viscosity at 25° C. within the above-described range may have excellent coatability, and a pre-coating layer formed of the photocurable composition and a coating layer including a cured product thereof may have excellent surface quality and thickness uniformity. Specifically, the below-described total thickness variation (TTV) of the pre-coating layer formed of the photocurable composition and a cured product thereof may be effectively reduced.

Another embodiment of the present disclosure provides a coating layer including a cured product of the photocurable composition.

The coating layer according to one embodiment of the present disclosure may have excellent surface quality by having a low TTV. As described above, since the photocurable composition has excellent wettability and coatability, a pre-coating layer formed of the photocurable composition may have excellent surface quality and thickness uniformity.

Accordingly, the coating layer formed by curing the pre-coating layer formed of the photocurable composition may also have excellent surface quality and thickness uniformity.

In addition, the coating layer may have excellent stress relaxation performance and mechanical properties.

According to one embodiment of the present disclosure, the photocurable composition may be cured by irradiation with UV light at a dose of 1.0 J/cm$^2$ to 1.5 J/cm$^2$ by means of a UV lamp with a wavelength of 300 nm to 400 nm.

According to one embodiment of the present disclosure, the coating layer may have a total thickness variation (TTV) of 3 m or less. Here, the total thickness variation (TTV) is defined as a difference between a maximum thickness and a minimum thickness.

According to one embodiment of the present disclosure, the coating layer may have a total thickness variation of 3 m or in the coating direction (MD) of the photocurable composition. Specifically, the total thickness variation of the coating layer in the coating direction (MD) may be 2 µm or less. In addition, the coating layer may have a total thickness variation of 3 µm or less, or 2 am or less, in a vertical direction (TD) orthogonal to the coating direction (MD). The coating layer having a total thickness variation in the coating direction (MD) and/or the vertical direction (TD) within the above-described ranges may have excellent surface quality and thickness uniformity.

Throughout the present specification, the coating direction (MD) of the photocurable composition is defined as a direction in which a substrate film is coated with the photocurable composition or the photocurable composition is applied onto a substrate film to form the coating layer. In addition, the vertical direction (TD) is defined as a direction orthogonal to the above-described coating direction (MD).

According to one embodiment of the present disclosure, the thickness of the coating layer may be 10 µm to 100 µm. Specifically, the thickness of the coating layer may be 15 m to 85 µm, 20 µm to 75 µm, 25 µm to 70 µm, 30 µm to 65 µm, 35 µm to 60 µm, 40 µm to 55 µm, 45 m to 50 m, 48 m to 50 m, 49 m to 51 m, or 53 m to 55 m. Where the thickness of the coating layer is controlled within in the above-described range, it is possible to further improve the stress relaxation performance and mechanical properties of the coating layer.

According to one embodiment of the present disclosure, the stress relaxation rate of the coating layer may be 78% or more. Specifically, the stress relaxation rate of the coating layer may be 79% or more, or 80% or more. In addition, the stress relaxation rate of the coating layer may be 82% or less, 81% or less, or 80% or less. The stress relaxation rate of the coating layer may be measured as described in Experimental Examples to be described later. The coating layer having a stress relaxation rate within the above-described range may be easily applied as a substrate for a semiconductor process.

According to one embodiment of the present disclosure, the tensile strength of the coating layer may be 28 MPa or more, 29 MPa or more, or 30 MPa or more. In addition, the tensile strength of the coating layer may be 31 MPa or less, 30.5 MPa or less, or 30 MPa or less. The tensile strength of the coating layer may be measured as described in Experimental Examples to be described later. The coating layer having a tensile strength within the above-described range may be easily applied as a substrate for a semiconductor process.

Still another embodiment of the present disclosure provides a substrate for a semiconductor process including: a substrate film; and the coating layer.

The substrate for a semiconductor process according to one embodiment of the present disclosure has excellent stress relaxation performance, and thus may minimize wafer shrinkage during wafer processing. Accordingly, the substrate for a semiconductor process may be easily applied to a semiconductor process such as a back grinding process or a dicing process. Furthermore, by using the substrate for a semiconductor process including the coating layer, it is possible to effectively prevent wafer warpage from occurring during a semiconductor process.

FIGS. 1a and 1b illustrate a substrate for a semiconductor process according to one embodiment of the present disclosure.

Referring to FIG. 1a, a substrate 100 for a semiconductor process according to one embodiment of the present disclosure may include a substrate film 10 and a coating layer 20 provided on one surface of the substrate film 10. In this case, the coating layer includes a cured product of the above-described photocurable composition.

According to one embodiment of the present disclosure, the substrate film may be a substrate film known in the art. For example, the substrate film may be a polyethylene terephthalate film, a polyolefin film, an ethylene-vinyl acetate film, a polybutylene terephthalate film, a polypropylene film, or a polyethylene film, but the type of the substrate film is not limited thereto.

According to one embodiment of the present disclosure, the thickness of the substrate film may be 10 μm to 100 μm. Specifically, the thickness of the substrate film may be 20 m to 80 m, 40 m to 60 m, 10 m to 70 m, 15 m to 65 m, 25 am to 62.5 m, 30 μm to 57 μm, 35 μm to 55 μm, 45 μm to 50 μm, 40 μm to 100 μm, 42.5 μm to 75 μm, 45 μm to 72.5 am, or 50 am to 65 m. Where the thickness of the substrate film is within the above-described range, it is possible to provide a substrate for a semiconductor process having excellent stress relaxation performance and mechanical properties.

According to one embodiment of the present disclosure, the photocurable composition may be applied onto the substrate film and photocured to form a coating layer on the substrate film. That is, the coating layer may be provided on the substrate film without a bonding film or an adhesive.

Referring to FIG. 1b, the substrate 100 for a semiconductor process according to one embodiment of the present disclosure may include: a substrate film 10; a coating layer 20 provided on one surface of the substrate film 10; and a hard coating layer 30 provided on one surface of the coating layer 20. In this case, the coating layer 20 includes a cured product of the above-described photocurable composition.

According to one embodiment of the present disclosure, the hard coating layer may be a hard coating layer known in the art. For example, the hard coating layer may include a cured product of a hard coating layer composition containing a solvent, a UV curable resin, a tack-free additive, and a photoinitiator.

According to one embodiment of the present disclosure, the thickness of the hard coating layer may be 0.5 μm to 5 μm. Where the thickness of the hard coating layer is within the above-described range, it is possible to further improve the durability and mechanical properties of the substrate for the semiconductor process.

Hereinafter, the present disclosure will be described in detail with reference to examples. However, the examples according to the present disclosure may be modified into various different forms, and the scope of the present disclosure is not interpreted as being limited to the examples described below. The examples of the present specification are provided to more completely explain the present disclosure to those skilled in the art.

Hereinafter, the present disclosure will be described in detail with reference to examples.

Production of Urethane (Meth)Acrylate-Based Resin Syrup

Production Example 1

Nippollan 963 (Tosoh Corp.) as a polyalkylene carbonate-based polyol including a carbonate repeating unit containing a pentylene having a methyl group as a side chain attached thereto, isophorone diisocyanate (IPDI; Evonik Corp.) and hexamethylene diisocyanate (50M-HDI, Asahi Kasei Corp.) as diisocyanate-based compounds, and isobornyl acrylate (IBOA, Solay Corp.) were introduced into and mixed together in a 2-L 5-neck reactor, thus preparing a first mixture. At this time, based on 100 parts by weight of Nippollan 963, the content of IPDI was about 13.8 parts by weight, the content of 50M-HDI was about 2.0 parts by weight.

Thereafter, the first mixture was warmed to and maintained at a temperature of 65° C., and 50 ppm of dibutyltin dilaurate (DBTDL), which is a tin-based catalyst, was added thereto. Then, an exothermic reaction of the resulting mixture was induced, thus producing a polyalkylene carbonate-based urethane prepolymer having an isocyanate end group.

Thereafter, a second mixture was prepared by mixing the produced polyalkylene carbonate-based urethane prepolymer with 2-hydroxyethyl methacrylate (2-HEMA, Japan Catalyst, Inc.) which is a reactive group-containing (meth)acrylate-based compound, and the disappearance of the NCO peak at 2,250 $cm^{-1}$ was confirmed by Fourier-transform infrared spectroscopy (FT-IR), thereby producing a urethane (meth)acrylate-based resin. At this time, based on 100 parts by weight of the polyalkylene carbonate-based urethane prepolymer, the content of 2-HEMA was about 6.4 parts by weight.

Thereafter, 2-ethylhexyl acrylate (2-EHA), O-phenylphenoxyethyl acrylate (OPPEA; M1142, Miwon Specialty Co. Ltd.), and 2-hydroxyethyl acrylate (2-HEA) were added to the produced urethane (meth)acrylate-based resin to produce a urethane (meth)acrylate-based resin syrup.

At this time, based on 100 parts by weight of the urethane (meth)acrylate-based resin syrup, the content of the urethane (meth)acrylate-based resin was 25 parts by weight, the content of IBOA was 33 parts by weight, the content of 2-EHA was 5 parts by weight, the content of OPPEA was 27 parts by weight, and the content of 2-HEA was 10 parts by weight.

The weight-average molecular weight of the produced urethane (meth)acrylate-based resin was 20,100 g/mol. In addition, the produced urethane (meth)acrylate-based resin syrup had a viscosity of about 760 cP at 20° C. and a viscosity of about 490 cP at 25° C., as measured by a Brookfield viscometer (rotating speed: 10 rpm) on spindle No. 40.

Production Example 2

A polyalkylene carbonate-based urethane prepolymer having an isocyanate end group was produced in the same manner as in Production Example 1, except that, based on 100 parts by weight of Nipollan 963, the content of IPDI was controlled to about 12.9 parts by weight and the content of 50M-HDI was controlled to about 1.4 parts by weight.

Thereafter, a urethane (meth)acrylate-based resin and a urethane (meth)acrylate-based resin syrup were produced in the same manner as in Production Example 1, except that, based on 100 parts by weight of the polyalkylene carbonate-based urethane prepolymer, the content of 2-HEMA was controlled to about 4.2 parts by weight.

The weight-average molecular weight of the produced urethane (meth)acrylate-based resin was 30,600 g/mol. In addition, the produced urethane (meth)acrylate-based resin syrup had a viscosity of about 1,810 cP at 20° C. and a viscosity of about 1,250 cP at 25° C., as measured by a Brookfield viscometer (rotating speed: 10 rpm) on spindle No. 40.

Production Example 3

A polyalkylene carbonate-based urethane prepolymer having an isocyanate end group was produced in the same manner as in Production Example 1, except that, based on 100 parts by weight of Nipollan 963, the content of IPDI was controlled to about 12.0 parts by weight and the content of 50M-HDI was controlled to about 0.9 parts by weight.

Thereafter, a urethane (meth)acrylate-based resin and a urethane (meth)acrylate-based resin syrup were produced in the same manner as in Production Example 1, except that, based on 100 parts by weight of the polyalkylene carbonate-based urethane prepolymer, the content of 2-HEMA was controlled to about 2.5 parts by weight.

The weight-average molecular weight of the produced urethane (meth)acrylate-based resin was 40,100 g/mol. In addition, the produced urethane (meth)acrylate-based resin syrup had a viscosity of about 3,100 cP at 20° C. and a viscosity of about 2,650 cP at 25° C., as measured by a Brookfield viscometer (rotating speed: 10 rpm) on spindle No. 40.

Production Example 4

A polyalkylene carbonate-based urethane prepolymer having an isocyanate end group, a urethane (meth)acrylate-based resin, and a urethane (meth)acrylate-based resin syrup were produced in the same manner as in Production Example 2, except that T5652 (Asahi Kasei Corp.) was used instead of Nippollan 963 as the polyalkylene carbonate-based polyol.

In this case, T5652 corresponds to a polyalkylene carbonate-based polyol including a carbonate repeating unit containing an alkylene having no side chain.

The weight-average molecular weight of the produced urethane (meth)acrylate-based resin was 30,600 g/mol. In addition, the produced urethane (meth)acrylate-based resin syrup had a viscosity of about 3,900 cP at 20° C. and a viscosity of about 3,500 cP at 25° C., as measured by a Brookfield viscometer (rotating speed: 10 rpm) on spindle No. 40.

Production Example 5

A polyalkylene carbonate-based urethane prepolymer having an isocyanate end group, a urethane (meth)acrylate-based resin, and a urethane (meth)acrylate-based resin syrup were produced in the same manner as in Production Example 3, except that T5652 (Asahi Kasei Corp.) was used instead of Nippollan 963 as the polyalkylene carbonate-based polyol.

The weight-average molecular weight of the produced urethane (meth)acrylate-based resin was 41,000 g/mol. In addition, the produced urethane (meth)acrylate-based resin syrup had a viscosity of about 6,520 cP at 20° C. and a viscosity of about 4,920 cP at 25° C., as measured by a Brookfield viscometer (rotating speed: 10 rpm) on spindle No. 40.

Production Example 6

A polyalkylene carbonate-based urethane prepolymer having an isocyanate end group, a urethane (meth)acrylate-based resin, and a urethane (meth)acrylate-based resin syrup were produced in the same manner as in Production Example 2, except that G3452 (Asahi Kasei Corp.) was used instead of Nippollan 963 as the polyalkylene carbonate-based polyol.

In this case, G3452 corresponds to a polyalkylene carbonate-based polyol including a carbonate repeating unit containing an alkylene having no side chain.

The weight-average molecular weight of the produced urethane (meth)acrylate-based resin was 29,500 g/mol. In addition, the produced urethane (meth)acrylate-based resin syrup had a viscosity of about 5,800 cP at 20° C. and a viscosity of about 4,100 cP at 25° C., as measured by a Brookfield viscometer (rotating speed: 10 rpm) on spindle No. 40.

Production Example 7

A polyalkylene carbonate-based urethane prepolymer having an isocyanate end group, a urethane (meth)acrylate-based resin, and a urethane (meth)acrylate-based resin syrup were produced in the same manner as in Production Example 2, except that T4672 (Asahi Kasei Corp.) was used instead of Nippollan 963 as the polyalkylene carbonate-based polyol.

In this case, T4672 corresponds to a polyalkylene carbonate-based polyol including a carbonate repeating unit containing an alkylene having no side chain.

The weight-average molecular weight of the produced urethane (meth)acrylate-based resin was 30,100 g/mol. In addition, the produced urethane (meth)acrylate-based resin syrup had a viscosity of about 6,890 cP at 20° C. and a viscosity of about 5,200 cP at 25° C., as measured by a Brookfield viscometer (rotating speed: 10 rpm) on spindle No. 40.

TABLE 1

|  | Prod. Example 1 | Prod. Example 2 | Prod. Example 3 | Prod. Example 4 | Prod. Example 5 | Prod. Example 6 | Prod. Example 7 |
| --- | --- | --- | --- | --- | --- | --- | --- |
| Polyalkylene carbonate-based polyol | Nippollan 963 | Nippollan 963 | Nippollan 963 | T5652 | T5652 | G3452 | T4672 |
| IPDI (parts by weight) | 13.8 | 12.9 | 12.0 | 12.9 | 12.0 | 12.9 | 12.9 |
| 50M-HDI (parts by weight) | 2.0 | 1.4 | 0.9 | 1.4 | 0.9 | 1.4 | 1.4 |
| 2-HEMA (parts by weight) | 6.4 | 4.2 | 2.5 | 4.2 | 2.5 | 4.2 | 4.2 |
| Mw (g/mol) | 20,100 | 30,600 | 40,100 | 30,600 | 41,000 | 29,500 | 30,100 |
| Viscosity (cP, 25° C.) | 490 | 1,250 | 2,650 | 3,500 | 4,920 | 4,100 | 5,200 |
| Viscosity (cP, 20° C.) | 760 | 1,810 | 3,100 | 3,900 | 6,520 | 5,800 | 6,890 |

In Table 1 above, the content of IPDI and the content of 50M-HDI are based on 100 parts by weight of polyalkylene carbonate-based polyol, and the content of 2-HEMA is based on 100 parts by weight of the produced polyalkylene carbonate-based urethane prepolymer.

Production of Photocurable Composition and Substrate for Semiconductor Process Including Coating Layer Example 1

A photocurable composition was produced by mixing the urethane (meth)acrylate-based resin syrup, produced in Production Example 1, with a trifunctional urethane (meth)acrylate-based compound (GD 301, LG Chem Ltd.) represented by Formula 1-1 (where $R_7$ to $R_9$ are each independently hydrogen), which has a weight-average molecular weight of 3,500 g/mol, 1,6-hexanediol diacrylate (HDDA; M200, Miwon Specialty Co., Ltd.) as a polyfunctional (meth)acrylate-based compound, and Irgacure #651 (BASF) as a photoinitiator.

At this time, based on 100 parts by weight of the urethane (meth)acrylate-based resin contained in the urethane (meth)acrylate-based resin syrup, the content of the trifunctional urethane (meth)acrylate-based compound was 4.8 parts by weight, the content of HDDA was 3.2 parts by weight, and the content of the photoinitiator was 2.0 parts by weight.

Then, the produced photocurable composition was applied onto a PET substrate film having a thickness of about 50 m by means of a slot die. Next, the photocurable composition was cured by irradiation with UV light at a total dose of 1.5 J/cm$^2$ by means of a UV lamp with a wavelength of 340 nm under a nitrogen atmosphere. Thereby, a substrate for a semiconductor process was produced in which a coating layer having a thickness of about 51 μm is formed on the PET substrate film.

Example 2

A coating layer and a substrate for a semiconductor process including the coating layer were produced in the same manner as in Example 1, except that the urethane (meth)acrylate-based resin syrup produced in Production Example 2 was used instead of the urethane (meth)acrylate-based resin syrup produced in Production Example 1.

Example 3

A coating layer and a substrate for a semiconductor process including the coating layer were produced in the same manner as in Example 1, except that the urethane (meth)acrylate-based resin syrup produced in Production Example 3 was used instead of the urethane (meth)acrylate-based resin syrup produced in Production Example 1.

Comparative Example 1

A coating layer and a substrate for a semiconductor process including the coating layer were produced in the same manner as in Example 1, except that the urethane (meth)acrylate-based resin syrup produced in Production Example 4 was used instead of the urethane (meth)acrylate-based resin syrup produced in Production Example 1.

Comparative Example 2

A coating layer and a substrate for a semiconductor process including the coating layer were produced in the same manner as in Example 1, except that the urethane (meth)acrylate-based resin syrup produced in Production Example 5 was used instead of the urethane (meth)acrylate-based resin syrup produced in Production Example 1.

Comparative Example 3

A coating layer and a substrate for a semiconductor process including the coating layer were produced in the same manner as in Example 1, except that the urethane (meth)acrylate-based resin syrup produced in Production Example 6 was used instead of the urethane (meth)acrylate-based resin syrup produced in Production Example 1.

Comparative Example 4

A coating layer and a substrate for a semiconductor process including the coating layer were produced in the same manner as in Example 1, except that the urethane (meth)acrylate-based resin syrup produced in Production Example 7 was used instead of the urethane (meth)acrylate-based resin syrup produced in Production Example 1.

Comparative Example 5

A coating layer and a substrate for a semiconductor process including the coating layer were produced in the same manner as in Example 1, except that the urethane (meth)acrylate-based resin syrup produced in Production Example 2 was used and the content of the trifunctional urethane (meth)acrylate-based compound was controlled to 1.0 part by weight based on 100 parts by weight of the urethane (meth)acrylate-based resin contained in the urethane (meth)acrylate-based resin syrup.

Comparative Example 6

A coating layer and a substrate for a semiconductor process including the coating layer were produced in the same manner as in Example 1, except that the urethane (meth)acrylate-based resin syrup produced in Production Example 2 was used and the content of the trifunctional urethane (meth)acrylate-based compound was controlled to 9.0 parts by weight based on 100 parts by weight of the urethane (meth)acrylate-based resin contained in the urethane (meth)acrylate-based resin syrup.

Comparative Example 7

A coating layer and a substrate for a semiconductor process including the coating layer were produced in the same manner as in Example 1, except that the urethane (meth)acrylate-based resin syrup produced in Production Example 2 was used and the content of HDDA as a polyfunctional (meth)acrylate-based compound was controlled to 0.5 parts by weight based on 100 parts by weight of the urethane (meth)acrylate-based resin contained in the urethane (meth)acrylate-based resin syrup.

Comparative Example 8

A coating layer and a substrate for a semiconductor process including the coating layer were produced in the same manner as in Example 1, except that the urethane (meth)acrylate-based resin syrup produced in Production Example 2 was used and the content of HDDA as a polyfunctional (meth)acrylate-based compound was controlled to 8.0 parts by weight based on 100 parts by weight of the urethane (meth)acrylate-based resin contained in the urethane (meth)acrylate-based resin syrup.

Experimental Examples

Viscosity Measurement

The viscosities (25° C.) of the photocurable compositions of Examples 1 to 3 and Comparative Examples 1 to 8 were measured, and the results of the measurement are shown in Table 2 below.

Specifically, the photocurable composition of Example 1 was debubbled to a bubble-free state, and then 0.5 mL was sampled therefrom by means of a 5-mL syringe. The viscosity of the sample was measured with a Brookfield viscometer (Brook field HB) on spindle No. 40 at 25° C. and a rotating speed of 10 rpm for 10 minutes, and the cP value at the time point when there was no change in viscosity was measured.

Then, the viscosities of the photocurable compositions of Examples 2 and 3 and Comparative Examples 1 to 8 were also measured in the same manner as described above.

Coatability Evaluation

The coatability of each of the photocurable compositions of Examples 1 to 3 and Comparative Examples 1 to 8 was evaluated as follows.

Specifically, the direction in which each photocurable composition is applied during production of a substrate for a semiconductor process was defined as a coating direction (MD). If a force applied to a pump during coating with the photocurable composition in the coating direction (MD) is high, the photocurable composition is not evenly applied due to the pump pressure, resulting in thickness variation. The coatability of each of the photocurable composition was evaluated based on the following criteria, and the results of the evaluation are shown in Tables 2 and 3 below.

<Criteria for Evaluation>
  O (good): the force applied to the pump is 1 kgf or less;
  Δ (possible): the force applied to the pump is greater than 1 kgf and not greater than 3 kgf;
  X (impossible): the force applied to the pump is greater than 3 kgf.

Measurement of Total Thickness Variation (TTV)

The total thickness variation (TTV) of the coating layer produced in each of Examples 1 to 3 and Comparative Examples 1 to 8 was measured as follows.

Specifically, the direction in which each photocurable composition is applied during production of a substrate for a semiconductor process was defined as a coating direction (MD), and direction orthogonal to the coating direction (MD) was defined as a vertical direction (TD). Then, the total thickness variation in each of the coating direction (MD) and the vertical direction (TD) was calculated by measuring the difference between the maximum thickness and the minimum thickness of each coating layer, and the results of the calculation are shown in Tables 2 and 3 below.

Evaluation of Stress Relaxation Performance

Evaluation of the stress relaxation performance of the substrate for a semiconductor process produced in each of Examples 1 to 3 and Comparative Examples 1 to 8 was performed as follows.

Stress relaxation performance refers to the degree to which cracking or warpage of a wafer due to an impact caused by the force generated during a back grinding process is prevented. A specimen having a size of 15 mm×100 mm×0.05 mm (width×width×thickness) was prepared from the substrate for a semiconductor process produced in each of Examples 1 to 3 and Comparative Examples 1 to 8. Then, while evaluation of stress relaxation performance was performed using a texture analyzer instrument (Stable Micro Systems), and the percent change between the initially measured force (A) and the force (B) measured 1 minute after each specimen was stretched by 40% was calculated using the following Equation 1. The results of the calculation are shown in Tables 2 and 3.

$$\text{Stress relaxation rate } (\%) = (A-B)/A \times 100 \qquad \text{[Equation 1]}$$

Measurement of Tensile Strength

The tensile strength of the substrate for a semiconductor process produced in each of Examples 1 to 3 and Comparative Examples 1 to 8 was measured as follows.

Specifically, the substrate for a semiconductor process produced in Example 1 was processed according to the ASTM D-882 standard, thus preparing a specimen. Thereafter, using a Universal Testing Machine (Roell Z0.5, Zwick Corp.), a force was applied to the specimen in a tensile direction, the tensile strength at break of the specimen was measured based on the final length versus the initial length. The results of the measurement are shown in Table 2 below.

Thereafter, for the substrate for a semiconductor process produced in each of Examples 2 and 3 and Comparative Examples 1 to 8, the tensile strength was measured in the same manner as described above, and the results of the measurement are shown in Tables 2 and 3 below.

TABLE 2

|  | Example 1 | Example 2 | Example 3 | Comparative Example 1 | Comparative Example 2 | Comparative Example 3 |
| --- | --- | --- | --- | --- | --- | --- |
| Urethane (meth)acrylate-based resin syrup | Production Example 1 | Production Example 2 | Production Example 3 | Production Example 4 | Production Example 5 | Production Example 6 |
| Viscosity (cP, 25° C.) | 550 | 1,310 | 2,760 | 3,650 | 5,010 | 4,350 |
| Coatability | O~Δ | O | O | Δ~X | X | X |
| TTV-MD (μm) | 1 | 1 | 2 | 4 | 8 | 6 |
| TTV-TD (μm) | 2 | 2 | 3 | 6 | 9 | 11 |
| Stress relaxation rate (%) | 79 | 78 | 80 | 78 | 75 | 73 |
| Tensile strength (MPa) | 28.3 | 29.2 | 30.1 | 30.9 | 30.5 | 31 |

TABLE 2-continued

|  | Comparative Example 4 | Comparative Example 5 | Comparative Example 6 | Comparative Example 7 | Comparative Example 8 |
|---|---|---|---|---|---|
| Urethane (meth)acrylate based resin syrup | Production Example 7 | Production Example 2 | Production Example 2 | Production Example 2 | Production Example 2 |
| Viscosity (cP, 25° C.) | 5,250 | 1,290 | 1,980 | 1,300 | 1,120 |
| Coatability | X | ○ | ○~Δ | ○ | Δ |
| TTV-MD (μm) | 7 | 2 | 5 | 2 | 6 |
| TTV-TD (μm) | 10 | 3 | 5 | 1 | 5 |
| Stress relaxation rate (%) | 72 | 75 | 65 | 77 | 60 |
| Tensile strength (MPa) | 32 | 24 | 31 | 25.5 | 32 |

Referring to Table 1 above, it was confirmed that, since the urethane (meth)acrylate-based resins produced in Examples 1 to 3 (corresponding to Production Examples 1 to 3, respectively) each included a carbonate repeating unit containing a $C_{1-10}$ alkylene having at least one $C_{1-3}$ side chain attached thereto, these resins had relatively high weight-average molecular weights, and the urethane (meth) acrylate-based resin syrups had low viscosities at 20° C. and 25° C.

On the other hand, it was confirmed that the urethane (meth)acrylate-based resins produced in Comparative Examples 1 to 4 (corresponding to Production Examples 4 to 7, respectively) each containing a carbonate repeating unit containing an alkylene having no side chain had high weight-average molecular weights, but the urethane (meth) acrylate-based resin syrups had high viscosities at 20° C. and 25° C.

Referring to Table 2 above, it was confirmed that the photocurable compositions according to Examples 1 to 3 of the present disclosure all had a viscosity of 3,000 cP or less at 25° C. and excellent coatability (particularly, slot die coatability). On the other hand, it was confirmed that the photocurable compositions according to Comparative Examples 1 to 4 all had a viscosity of higher than 3,000 cP at 25° C. and poor coatability compared to Examples 1 to 3.

In addition, it was confirmed that the coating layers according to Examples 1 to 3 of the present disclosure all had a total thickness variation (TTV) of 2 μm or less in the coating direction (MD) and a total thickness variation (TTV) of 3 μm or less in the vertical direction (TD), suggesting that the coating layers had excellent surface quality and thickness uniformity. Furthermore, it was confirmed that the substrates for a semiconductor process according to Examples 1 to 3 of the present disclosure all had a stress relaxation rate of 78% or more, suggesting that the substrates had excellent stress relaxation performance and exhibited appropriate tensile strength.

On the other hand, referring to Tables 2 and 3 above, it was confirmed that the coating layers according to Comparative Examples 1 to 4 all had a total thickness variation (TTV) of 4 μm or more in the coating direction (MD) and a total thickness variation (TTV) of 6 m or more in the vertical direction (TD), suggesting that these coating layers had poor surface quality and thickness uniformity. In addition, it was confirmed that, in the case of the coating layer according to Comparative Example 5 in which the content of the trifunctional urethane (meth)acrylate-based compound was low and the coating layer according to Comparative Example 7 in which the content of the polyfunctional (meth)acrylate-based compound was low, the total thickness variation (TTV) in the coating direction (MD) was as good as 4 μm or less, but the curing density was low, and hence the stress relaxation rate and the tensile strength were lower than those of Examples 1 to 3.

In addition, it was confirmed that, in the case of the coating layer according to Comparative Example 6 in which the content of the trifunctional urethane (meth)acrylate-based compound was high and the coating layer according to Comparative Example 8 in which the content of the polyfunctional (meth)acrylate-based compound was high, the curing density was high, and hence the total thickness variation (TTV) in the coating direction (MD) was more than 4 am. Accordingly, it was confirmed that the stress relaxation rate decreased to less than 70% and the tensile strength somewhat increased.

Therefore, it can be seen that the photocurable composition according to one embodiment of the present disclosure has excellent coatability, and thus may provide a coating layer having excellent surface quality and thickness uniformity, suggesting that it may improve the processing quality and processing efficiency of a wafer in a wafer back grinding process, a dicing process, or the lik-Subste. In addition, it can be seen that the substrate for a semiconductor process, produced using the photocurable composition according to one embodiment of the present disclosure, has an excellent stress relaxation rate and tensile strength, and thus may effectively prevent wafer warpage when applied to a semiconductor process.

REFERENCE NUMERALS IN COMPARATIVE EXAMPLE

100: a substrate for a semiconductor process
10: a substrate film
20: a coating layer
30: a hard coating layer

What is claimed is:
1. A photocurable composition comprising:
   a urethane (meth)acrylate-based resin syrup comprising a urethane (meth)acrylate-based resin, which is a reaction product of a polyalkylene carbonate-based urethane prepolymer having an isocyanate end group and a reactive group-containing (meth)acrylate-based compound, and a (meth)acrylate-based monomer mixture;
   a polyfunctional urethane (meth)acrylate-based compound; and
   a polyfunctional (meth)acrylate-based compound, wherein the urethane (meth)acrylate-based resin comprises a carbonate repeating unit containing a $C_{1-10}$ alkylene having at least one $C_{1-3}$ side chain attached thereto, and wherein the polyfunctional urethane (meth)acrylate-based compound comprises a compound represented by the following Formula 1:

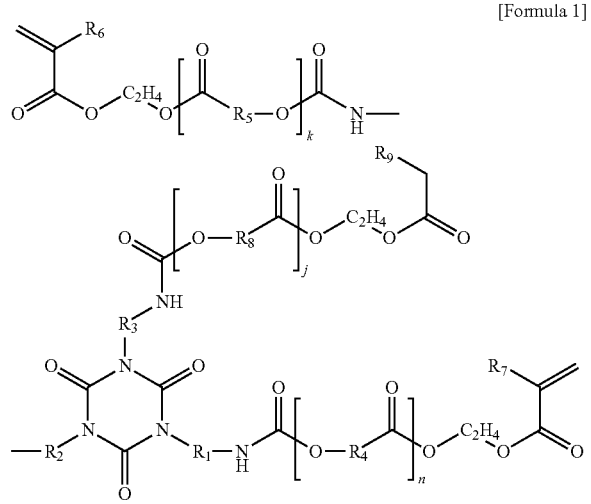

[Formula 1]

wherein $R_1$, $R_2$, and $R_3$ are each independently a $C_{2-10}$ alkylene, $R_4$, $R_5$, and $R_6$ are each independently a $C_{2-7}$ alkylene, $R_7$, $R_8$, and $R_9$ are each independently hydrogen or a methyl group, and n, j and k are each independently an integer ranging from 1 to 3.

2. The photocurable composition of claim 1, wherein the urethane (meth)acrylate-based resin has a weight-average molecular weight of 20,000 g/mol to 50,000 g/mol.

3. The photocurable composition of claim 1, wherein the urethane (meth)acrylate-based resin syrup has a viscosity of 400 cP to 3,300 cP.

4. The photocurable composition of claim 1, wherein the polyalkylene carbonate-based urethane prepolymer is a reaction product of a polyalkylene carbonate-based polyol and a diisocyanate-based compound.

5. The photocurable composition of claim 4, wherein a content of the diisocyanate-based compound is 10 parts by weight to 20 parts by weight based on 100 parts by weight of the polyalkylene carbonate-based polyol.

6. The photocurable composition of claim 1, wherein a content of the reactive group-containing (meth)acrylate-based compound is 1 part by weight to 10 parts by weight based on 100 parts by weight of the polyalkylene carbonate-based urethane prepolymer.

7. The photocurable composition of claim 1, wherein a content of the urethane (meth)acrylate-based resin is 15 parts by weight to 35 parts by weight based on 100 parts by weight of the urethane (meth)acrylate-based resin syrup.

8. The photocurable composition of claim 1, wherein the (meth)acrylate-based monomer mixture comprises at least one type of monomer selected from an alkyl group-containing (meth)acrylate-based monomer, an alicyclic alkyl group-containing (meth)acrylate-based monomer, an aromatic group-containing (meth)acrylate-based monomer, and a polar functional group-containing (meth)acrylate-based monomer.

9. The photocurable composition of claim 1, wherein a content of the (meth)acrylate-based monomer mixture is 65 parts by weight to 85 parts by weight based on 100 parts by weight of the urethane (meth)acrylate-based resin syrup.

10. The photocurable composition of claim 1, wherein a content of the polyfunctional urethane (meth)acrylate-based compound is 2.5 parts by weight to 7.5 parts by weight based on 100 parts by weight of the urethane (meth)acrylate-based resin.

11. The photocurable composition of claim 1, wherein a content of the polyfunctional (meth)acrylate-based compound is 1 part by weight to 5 parts by weight based on 100 parts by weight of the urethane (meth)acrylate-based resin.

12. The photocurable composition of claim 1, further comprising a photoinitiator, wherein a content of the photoinitiator is 0.5 parts by weight to 3 parts by weight based on 100 parts by weight of the urethane (meth)acrylate-based resin.

13. The photocurable composition of claim 1, having a viscosity of 3,000 cP or less.

14. A coating layer comprising a cured product of the photocurable composition according to claim 1.

15. The coating layer of claim 14, having a total thickness variation of 3 μm or less, wherein the total thickness variation is defined as a difference between a maximum thickness and a minimum thickness.

16. A substrate for a semiconductor process comprising:
a substrate film; and
the coating layer according to claim 14.

* * * * *